April 17, 1951 R. H. KERSHAW 2,549,100
APPLIANCE MOUNT FOR VEHICLE DOORS
Filed May 28, 1948

INVENTOR.
ROBERT H. KERSHAW
BY
ATTORNEY.

Patented Apr. 17, 1951

2,549,100

UNITED STATES PATENT OFFICE 2,549,100

APPLIANCE MOUNT FOR VEHICLE DOORS

Robert H. Kershaw, Long Beach, Calif.

Application May 28, 1948, Serial No. 29,912

4 Claims. (Cl. 248—226)

This invention relates to an appliance mount which is attachable to the door of a vehicle, and which will support various appliances, such as a rear view mirror, a spot-light, or a radio aerial.

An object of my invention is to provide a novel appliance mount for vehicle doors which can be attached to the door without drilling, tapping, or cutting the metal portion of the door.

Another object of my invention is to provide a novel appliance mount for vehicle doors which, when attached to the door of a vehicle, will still permit the sliding window of the door to move upwardly or downwardly as desired.

Still another object is to provide a novel appliance mount of the character stated, which is simple in construction, inexpensive to manufacture, and which can be easily and quickly mounted on the door of the vehicle.

Other objects, advantages and features of invention may appear from the accompanying drawing, the subjoined detailed description, and the appended claims.

Figure 1:
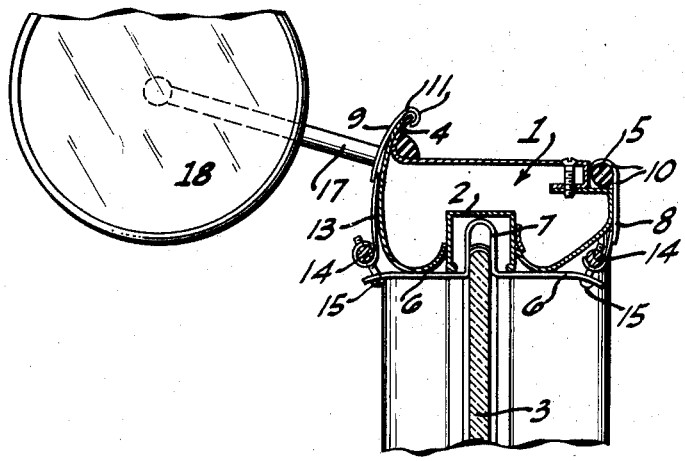
Figure 1 is a fragmentary, transverse, sectional view of a vehicle door with my mount installed thereon.
Figure 2:
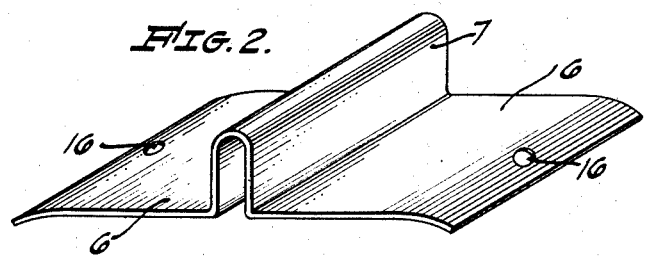
Figure 2 is a perspective view of the mount plate.
Figure 3:
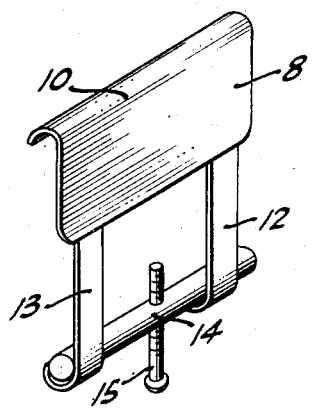
Figure 3 is a perspective view of one of the clamping fingers.
Figure 4:
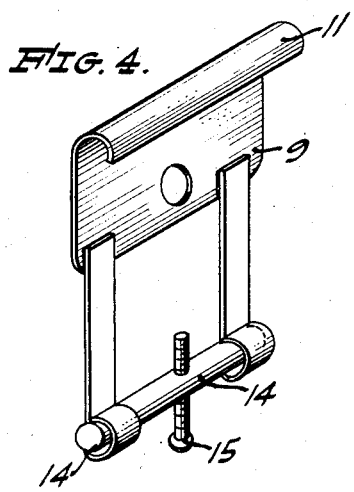
Figure 4 is a perspective view of another of the clamping fingers.

Referring more particularly to the drawing, the numeral, 1, indicates the frame of a vehicle door. This frame includes a horizontal channel 2, into which the glass 3, fits when this glass window is closed. The frame 1, also includes a flange 4, which extends horizontally along its outer edge and a packing 5, which extends horizontally along the inner edge of the door. My mount includes a plate 6, which is preferably formed of a suitable metal, and is positioned transversely of the door frame 1, substantially as shown in Figure 1. A channel 7, is bent upwardly in the plate 6, and extends the length of the plate. This channel extends into the channel 2, substantially as shown in Figure 1; the purpose of the channel 7, is to receive the glass 3, when the glass is in raised or closed position.

A plate 6, acts as a base to support or carry the fingers 8 and 9. These fingers are formed of a suitable metal, and each have a curved lip 10, 11, respectively, at the top thereof. The lip 10, engages the packing 5, and the lip 11, engages the flange 4, substantially as shown in Figure 1. The fingers 8 and 9, each have a pair of straps 12, 13, fixedly attached to the lower ends thereof, and these straps are secured at their outer ends to a rod 14, into which a bolt 15, is threaded. The bolts 15, pass through suitable holes 16, in the plate 6, and then thread into the rods 14, thus drawing the plate 6, tightly against the bottom of the frame 1. The purpose of the flexible straps 12, and 13, is to permit adjustment of the rod 14, so that various shapes and sizes of door frames can be accommodated. The outer finger 9, carries a bracket 17, which supports an appliance such as a rear view mirror 18, or a spot-light, or a radio aerial, as might be desired.

The bracket 17, is fixedly secured to the finger 9, and provides a very sturdy support for an appliance when the parts are assembled on the door frame.

Having described my invention, I claim:

1. An appliance mount for vehicle doors, comprising a plate extending transversely of the door, a pair of fingers, each of said fingers engaging the frame of the door, means adjustably attaching said fingers to said plate, and a channel on said plate into which the glass of the door extends, and a bracket on one of said fingers.

2. An appliance mount for vehicle doors, comprising a plate extending transversely of the door, said plate having a channel therein to receive the glass in the vehicle door, a pair of fingers engageable with the vehicle door frame, a bracket on one of said fingers, a bolt extending through said plate, and means on each of the fingers into which said bolt is threaded.

3. An appliance mount for vehicle doors, comprising a plate extending transversely of the door, said plate having a channel therein to receive the glass in the vehicle door, a pair of fingers engageable with the vehicle door frame, a bracket on one of said fingers, a bolt extending through said plate, a rod on each of said fingers, and flexible straps secured to said rod, and said fingers, said bolt being threaded into said rod.

4. An appliance mount for vehicle doors, comprising a plate extending transversely of the door, said plate having a channel extending longitudinally thereof, and adapted to receive the window glass, a finger on each side of the plate, a hook on the top of each of the fingers engaging the door frame, an appliance bracket on one of said fingers, a rod adjustably mounted on each of the fingers, a pair of flexible straps secured to the fingers, and to the strap, and a bolt extending through the plate and threaded into said rod.

ROBERT H. KERSHAW.

REFERENCES CITED

The following references are of record in the file of this patent:

UNITED STATES PATENTS

| Number | Name | Date |
|---|---|---|
| 813,749 | Terry | Feb. 27, 1906 |
| 1,625,673 | Nelson | Apr. 19, 1927 |
| 1,905,623 | Deitz | Apr. 25, 1933 |
| 2,043,041 | Goeddeke | June 2, 1936 |